UNITED STATES PATENT OFFICE.

CARLETON ELLIS AND ALFRED A. WELLS, OF MONTCLAIR, NEW JERSEY, ASSIGNORS, BY MESNE ASSIGNMENTS, TO NATIONAL CARBON COMPANY, INC., OF LONG ISLAND CITY, NEW YORK, A CORPORATION OF NEW YORK.

PREPARATION OF HIGHER OXID-OF-MANGANESE DEPOLARIZING MATERIAL.

1,275,666. Specification of Letters Patent. Patented Aug. 13, 1918.

No Drawing. Application filed December 6, 1916. Serial No. 135,406.

*To all whom it may concern:*

Be it known that we, CARLETON ELLIS and ALFRED A. WELLS, citizens of the United States, residing at Montclair, in the county of Essex and State of New Jersey, have invented certain new and useful Improvements in the Preparation of Higher Oxid-of-Manganese Depolarizing Material, of which the following is a specification.

This invention relates to a method of making manganese depolarizing material and to the product thereof and is concerned especially with the production of an active higher oxid of manganese product especially suited for use in miniature dry cells of the Leclanche type.

The process of the present invention involves the oxidation of compounds of a lower stage of oxidation to a more thoroughly oxidized state by exposure to a heated oxidizing atmosphere containing steam or moisture and also involves certain procedure with reference to the preparation of such manganese compound or compounds in a lower stage of oxidation, all as will be hereinafter more fully described and typified by an illustrative example.

For example, starting with a soluble salt of manganese, such as the sulfate, the following procedure may be employed in the practice of the present invention:

Manganese sulfate is dissolved in water and to it a fairly concentrated solution of sodium carbonate is added until the reaction is alkaline. The bulky precipitate which is formed and which consists largely of manganous carbonate in a hydrated state is thrown on a filter and allowed to drain. Without washing, the mass is then dried, yielding a product containing a considerable amount of sodium sulfate distributed therethrough, which acts as a bulking agent and which by crystallizing out in the drying operation in the presence of the damp or plastic manganous carbonate serves to extend the latter thus affording a large surface exposure that is advantageous in the subsequent oxidizing stage. If, in the drying operation, the product has become caked, it may be ground to a fine powder, when it is ready for the oxidizing stage of the process. For this purpose the material is preferably placed in a rotary iron drum which preferably is inclosed in a chamber that may be externally heated so as to form an air bath for uniform heating of the manganese material to be oxidized. The drum is equipped with hollow trunnions, through one of which a mixture of oxygen or air and steam or moisture may be introduced. This is very readily effected by passing a current of air through water in a vessel which is maintained at a temperature of about 90° C. The air becomes charged with moisture and is passed into the oxidizing drum where it comes in contact with the manganese material at a temperature of preferably around 200–250° C. and upward, when oxidation takes place, the manganese carbonate becoming transformed into a black product containing a relatively high proportion of manganese dioxid or equivalent higher oxid material. In one observation the chamber was kept at 220–250° C. and the oxidation was allowed to progress for several hours when the black higher oxid material of good quality was obtained. This was washed and dried. In some cases the quality may be bettered by washing the final product with dilute nitric acid to extract any soluble bodies. In a parallel test conducted with manganous carbonate similarly made but washed free from soluble salts and then oxidized under like conditions except no moisture was introduced, a light brown powder of little or no value as a depolarizing agent was obtained.

In connection with the aforesaid process it should be understood that in place of manganese sulfate other salts of manganese of an analogous character may be employed, including the chlorid, nitrate and the like and that sodium hydrate or other suitable alkali precipitant may be employed in place of sodium carbonate, also that more or less of the sodium sulfate may be left in the mass of precipitate which is to be dried, from a negligible quantity up to the full amount available from the reaction, or if desired an additional quantity of sodium sulfate or other compatible soluble salt, etc., may be added to the precipitate or solution in which the precipitation is made to produce the bulking effect. Or in other cases the mass which is allowed to drain on the filter may be washed more or less to reduce the content of soluble salt to any degree which may be desired under the specific conditions of operation, etc. In lieu of adding the sodium carbonate solution to the manganese sulfate solution the latter may be added to the former so that the manganese sulfate is entered into an excess of the alkali as a result of which and by proper stirring and heating, the avoidance of any material formation of basic manganous sulfate is secured, thereby tending to eliminate certain undesirable impurities in depolarizing compositions.

The temperature in the rotary oxidizer may be varied to meet the requirements of the material which is undergoing treatment but the oxidation should be allowed to progress so as to yield a product ordinarily analyzing at least fifty per cent. of manganese dioxid and preferably substantially higher percentages. Hence the period of exposure to air and steam may be adjusted with reference to the character of the final product desired. The present procedure does not preclude the use of wet oxidizing reagents, such as permanganate solutions to further oxidize the roasted or calcined product if or when such treatment may be useful.

What we claim is:—

1. The process of making manganese dioxid from a soluble manganous salt which comprises precipitating a solution of a manganous salt with an alkaline reagent, in drying the product without washing; whereby saline bodies are left in the mass and in exposing the product to heated air and moisture at a temperature of about 200° C.

2. The process of making a higher oxid of manganese from a soluble manganous salt which comprises precipitating a solution of a manganous salt with an alkaline reagent, in drying the product without washing; whereby saline bodies are left in the mass and in heating the product in the presence of air and moisture at a temperature of about 200° C.

3. The process of making manganese dioxid from a soluble manganous salt which comprises precipitating a solution of a manganous salt with an alkaline reagent, in drying the product without washing; whereby saline bodies are left in the mass, in exposing the product to heated air and moisture at a temperature of about 200° C. and in washing the product of oxidation.

4. The process of making higher oxid of manganese from a manganous compound which comprises precipitating a solution of a manganous compound with an alkaline reagent, in drying the product without complete washing; whereby saline bodies are left in the mass and in exposing the product to heated air and moisture.

5. The process of making a higher oxid of manganese depolarizing material which comprises precipitating a solution of manganous sulfate with sodium carbonate, in collecting the precipitate and drying without complete removal of sodium sulfate, in grinding the product, in exposing the dried product to a current of air and water vapor at a temperature of about 200° C., in maintaining the heating conditions uniform and in agitating the mass during such period of exposure and in washing and drying the product.

6. The process of making a higher oxid of manganese depolarizing material which comprises precipitating a solution of a manganous salt with alkali metal carbonate, in collecting the precipitate and drying without complete removal of any soluble salts, in exposing the dried product to a current of air and water vapor at a temperature of about 200–250° C., in maintaining the heating conditions substantially uniform and in agitating the mass during such period of exposure.

7. The process of making a higher oxid of manganese depolarizing material which comprises precipitating a solution of manganous sulfate with sodium carbonate, in collecting the precipitate and drying without complete removal of sodium sulfate, in exposing the product to a current of air and water vapor at a temperature of about 250° C., in maintaining the heating conditions uniform and in agitating the mass during such period of exposure and in washing and drying the product.

8. The process of making a higher oxid of manganese depolarizing material which comprises precipitating a solution of a manganous salt, in collecting the precipitate in the presence of saline bodies and drying without complete removal of any soluble salts, in exposing the product to air and water vapor at an elevated temperature, in agitating the mass during such period of exposure and in washing the product.

9. The process of making a higher oxid of manganese depolarizing material which comprises precipitating a solution of a manganous salt with sodium carbonate, in collecting the precipitate and exposing to a current of air and water vapor at a temperature of about 200° C., and in agitating the material during such period of exposure.

10. The process of making a higher oxid of manganese depolarizing material which comprises drying a precipitate of manganous carbonate containing saline bodies without complete removal of said saline bodies, in exposing the product to oxygen and water vapor at an oxidizing temperature, in agitating the material at some time during such period of exposure and in washing and drying the product.

11. The process of making a higher oxid of manganese depolarizing material which comprises precipitating a solution of manganese sulfate with sodium carbonate, in collecting the precipitate and drying without complete removal of sodium sulfate, in exposing the product to a current of air and water vapor at above ordinary temperature, and in agitating the material during such period of exposure.

In testimony whereof we have affixed our signatures.

CARLETON ELLIS,
ALFRED A. WELLS.